United States Patent
Maki et al.

(10) Patent No.: US 7,078,010 B2
(45) Date of Patent: Jul. 18, 2006

(54) METHOD FOR PRODUCING α-ALUMINA POWDER

(75) Inventors: Hajime Maki, Niihama (JP); Yoshiaki Takeuchi, Niihama (JP); Kazuhisa Kajihara, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 254 days.

(21) Appl. No.: 10/846,693

(22) Filed: May 17, 2004

(65) Prior Publication Data

US 2005/0008565 A1    Jan. 13, 2005

(30) Foreign Application Priority Data

May 19, 2003    (JP)    ............................. 2003-139910

(51) Int. Cl.
*C01F 7/02*    (2006.01)

(52) U.S. Cl. .................. 423/625; 423/111; 423/631
(58) Field of Classification Search ................ 423/111, 423/625, 631
See application file for complete search history.

(56) References Cited

U.S. PATENT DOCUMENTS

| | | | |
|---|---|---|---|
| 1,652,119 A * | 12/1927 | Halvorsen et al. | .......... 423/631 |
| 4,098,874 A | 7/1978 | Mitsche et al. | |
| 4,657,754 A | 4/1987 | Bauer et al. | |
| 4,837,069 A * | 6/1989 | Bescup et al. | .............. 428/148 |
| 2004/0184984 A1* | 9/2004 | Maki et al. | ................. 423/625 |
| 2005/0214201 A1* | 9/2005 | Maruno et al. | ............. 423/625 |

FOREIGN PATENT DOCUMENTS

| | | |
|---|---|---|
| WO | WO 00/69790 A2 | 11/2000 |
| WO | WO 01/23321 A1 | 4/2001 |
| WO | WO 02/08124 A2 | 1/2002 |

OTHER PUBLICATIONS

H. Ma et al., "Synthesis and Processing of Nano-α-$Al_2O_3$ Powders", *Key Engineering Materials*, Aedermannsdorf, CH, vol. 206-213, Sep. 9, 2001, pp. 43-46 (XP008025131).

Y. Takeda et al., "Crystallization Behavior of Alumina Gels Prepared by Sol-Gen Method Using Nitric Acid as a Catalyst", *Journal of the Ceramic Society of Japan*, vol. 110, No. 11, 2002, pp. 1025-1028 (XP008046381).

P.K. Sharma et al., "A critical role of pH in the colloidal synthesis and phase transformation of nano size α-$Al_2O_3$ with high surface area", *Journal of the European Ceramic Society*, vol. 23, 2003, pp. 659-666.

(Continued)

*Primary Examiner*—Stanley Silverman
*Assistant Examiner*—Timothy C. Vanoy
(74) *Attorney, Agent, or Firm*—Sughrue Mion, PLLC

(57) ABSTRACT

A method for producing α-alumina powder is described. The method comprises the steps of removing water from a compound containing the following (1), (2), (3) and (4), and calcining the results:

(1) α-alumina precursor,
(2) seed crystal,
(3) water,
(4) nitrate ion in an amount of from 2.8 to 3.3 mol per mol of aluminum (Al) contained in the α-alumina precursor and the seed crystal.

10 Claims, 2 Drawing Sheets

OTHER PUBLICATIONS

A.C. Pierre et al., "Gelation of Aluminum Hydroxide Sols", *J. Am. Ceram. Soc.*, vol. 70, No. 1, 1987, pp. 28-32 (XP-001188399).

Taichi Sato, "Aluminium Hydroxides and Aluminas", *Mineraology Association Magazine*, vol. 19, No. 1, Mar. 1989, pp. 21-41, with English Abstract.

Krell et al., "Nanocorumdum—Advanced Synthesis and Processing", *NanoStructured Materials*, vol. 11, No. 8, 1999, pp. 1141-1153.

WPI Abstract of WO 2000/069790.

Rajendran et al., "Fabrication of a Fine Grained Alumina Ceramic", *Key Engineering Materials*, vols. 53-55, 1991, pp. 462-268.

Felde et al., "Synthesis of Ultrafine Alumina Power by Sol-Gel Techniques", *9th Cimtec-World Ceramics Congress, Ceramics: Getting into the 2000's—Part B*, P. Vincenzini, Editor, 1999, pp. 49-56.

Yang et al., "Preparation of Ultrafine $\alpha$-$Al_2O_3$ Powder by Thermal Decomposition of AACH at Low Temperature", *The Chinese Journal of Process Engineering*, vol. 2, No. 4, Aug. 2002, pp. 325-329.

* cited by examiner

METHOD FOR PRODUCING α-ALUMINA POWDER

BACKGROUND OF THE INVENTION

1. Field of the Invention

The present invention relates to a method for producing an α-alumina powder. More particularly, the present invention relates to a method for producing an α-alumina powder having a high α-ratio, large BET specific surface area to provide a small amount of α-alumina particles having necking.

2. Description of Related Art

An α-alumina powder is a compound-of the formula $Al_2O_3$ and has an α crystal phase. An α-alumina powder is widely used, for example, as a raw material for producing a sintered body such as a translucent tube. From the standpoint of improvement in the strength of a sintered body, α-alumina used as a raw material is required to have a high α-ratio, large BET specific surface area, and to provide a small amount of α-alumina particles having necking.

Conventionally, as a method for producing such an α-alumina powder, there is known a method of calcining an α alumina raw material in the presence of ammonium nitrate (Key Engineering Materials, Vol. 53–55 (1991), 462–468).

However, the properties of an α-alumina powder obtained by the conventional method are not satisfactory for producing a sintered body.

SUMMARY OF THE INVENTION

The present inventors have investigated a method for producing an α-alumina powder, resultantly leading to completion of the present invention.

Namely, the present invention provides a method for producing an α-alumina powder comprising the steps of removing water from a compound containing the following (1), (2), (3) and (4), and calcining the results:

(1) α-alumina precursor,
(2) seed crystal,
(3) water,
(4) nitrate ion in an amount of from 2.8 to 3.3 mol per mol of aluminum (Al) contained in the α-alumina precursor and the seed crystal.

DETAILED DESCRIPTION OF THE PREFERRED EMBODIMENTS

Figure 1:
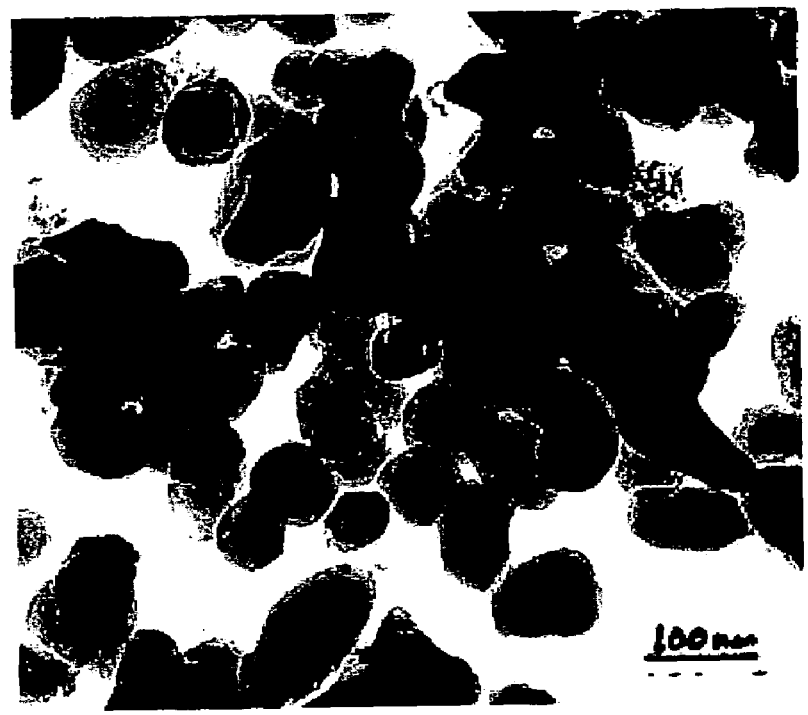
FIG. 1 shows a transmission electron micrograph of an α-alumina powder obtained in Example 1.

The method for producing an α-alumina powder of the present invention comprises a step of removing water from a compound containing an α-alumina precursor, a seed crystal, water and a nitrate ion and a step of calcining the results.

The above-mentioned α-alumina precursor may be a compound converting into α-alumina by calcination described later, and examples thereof include aluminum salts, aluminum alkoxide, transition alumina, aluminum hydroxide, hydrolysate of aluminum compound and the like.

The aluminum salt includes, for example, an aluminum inorganic salt such as aluminum nitrate, aluminum sulfate, aluminum ammonium sulfate and ammonium aluminum carbonate hydroxide; or an aluminum organic salt such as aluminum oxalate, aluminum acetate, aluminum stearate, ammonium alum, aluminum lactate and aluminum laurate.

Aluminum alkoxide includes, for example, aluminum isopropoxide, aluminum ethoxide, aluminum sec-butoxide, aluminum t-butoxide or the like.

The transition alumina includes, for example, that in which a crystal phase is γ, χ, θ, ρ or κ.

The aluminum hydroxide includes, for example, a crystalline compound in which a crystal phase is gibbsite, boehmite, pseudo-boehmite, bayerite, norstrandite or diaspore, or an amorphous compound.

The hydrolyzate of aluminum compound may advantageously be, for example, a hydrolyzate of a water-soluble aluminum compound, and examples thereof include those obtained by reacting an aluminum salt (aluminum inorganic salt, aluminum organic salt) with a base in the presence of water, or those obtained by reacting an alkoxide (aluminum isopropoxide, aluminum ethoxide, aluminum sec-butoxide, aluminum t-butoxide) with water.

The α-alumina precursor is preferably an aluminum salt, more preferably an aluminum inorganic salt, further preferably an aluminum nitrate salt.

The seed crystal may advantageously be that promoting phase transformation from an α-alumina precursor into α-alumina in calcination described later, and usually a metal oxide, and examples thereof include alumina ($Al_2O_3$), iron oxide ($Fe_2O_3$) and chromium oxide ($Cr_2O_3$). The seed crystal is preferably a metal oxide having corundum crystal structure, and the metal oxide includes, for example, α-alumina, α-iron oxide or α-chromium oxide, preferably α-alumina.

The seed crystal has an average primary particle diameter of usually about 0.01 μm or more, preferably about 0.05 μm or more, and usually about 0.5 μm or less.

The seed crystal has a BET specific surface area of usually about 12 $m^2/g$ or more, preferably about 15 $m^2/g$ or more, and usually about 150 $m^2/g$ or less.

α-alumina used as the seed crystal may advantageously be prepared by, for example, a method in which aluminum hydroxide obtained by hydrolysis of aluminum isopropoxide is pre-calcined to obtain transition alumina, the obtained transition alumina is ground, then, calcined and ground. Iron oxide and chromium oxide may be advantageously prepared by, for example, a method of grinding commercially available products.

The amount of the seed crystal is usually about 5 parts by weight or more, preferably about 10 parts by weight or more and usually about 50 parts by weight or less, preferably about 30 parts by weight or less based on 100 parts by weight of the total amount of the α-alumina precursor and the seed crystal, in terms of oxide of metal component.

As the water, usually used are pure water, ion exchanged water and distilled water. The amount of the water is usually about 50 parts by weight or more, preferably about 100 parts by weight or more and usually about 1000 parts by weight or less, preferably about 500 parts by weight or less based on 100 parts by weight of the total amount of the α-alumina precursor and the seed crystal.

The nitrate ion contained in compound is usually represented by the formula: $NO_3^-$. When the α-alumina precursor is a compound such as aluminum nitrate generating a nitrate ion in water, the nitrate ion contained in compound may be generated by dissolution of this α-alumina precursor in water.

The nitrate ion contained in compound may also be that generated by dissolution of a nitric acid non-metal salt (ammonium nitrate, nitric acid urea, hydroxyl ammonium nitrate, propyl nitrate, nitrate ester, ethanoyl nitrate, ethyl nitrate, ethylene nitrate and the like) in water.

The concentration of a nitrate ion in compound is usually 2.8 mol or more, preferably 2.9 mol or more and usually 3.3 mol or less, preferably 3.2 mol or less per mol of aluminum (Al) contained in compound. When the seed crystal is other than alumina, the amount of the aluminum in compound is equal to the amount of aluminum contained in the above-mentioned α-alumina precursor. When the seed crystal includes alumina, the amount of the aluminum in compound is equal to the total amount of aluminum contained in the seed crystal and aluminum contained in the α-alumina precursor.

The compound may advantageously be prepared by mixing an α-alumina precursor with water, then, mixing a seed crystal and a compound (nitric acid non-metal salt and the like) generating a nitrate ion.

Removal of water may advantageously be conducted by a method of evaporating water in the compound to obtain dry solid by conventional methods such as a freeze-drying and a reduced-pressure drying. Removal of water is usually conducted at 100° C. or lower.

Removal of water may be conducted also by a method in which water and solid are separated from the compound by solid-liquid separation such as filtration and centrifugal separation, then, the resulting solid is dried. Solid-liquid separation is usually conducted at 100° C. or less. Drying may be conducted by air drying or heating. Drying is conducted usually at 100° C. or less under air or an inert gas (for example, $N_2$, Ar). Pressure of the gas is usually 1 atom or less.

The mixture obtained by removing water from the compound is usually powdery, containing an α-alumina precursor, seed crystal and nitrate salt. When a non-metal salt of nitric acid (ammonium nitrate, nitric acid urea, hydroxyl ammonium nitrate, propyl nitrate, nitrate ester, ethanoyl nitrate, ethyl nitrate, ethylene nitrate and the like) is used as the compound generating a nitrate ion, the mixture further contains a product obtained by reacting the α-alumina precursor with the non-metal salt of nitric acid. In removing water, the product may be usually deposited.

The method of the present invention comprises a step of calcining the mixture obtained above.

Calcination may advantageously be conducted by using an apparatus such as a tubular electric furnace, box-type electric furnace, tunnel furnace, far-infrared furnace, microwave furnace, shaft furnace, reflection furnace, rotary furnace and Roller Hearth furnace. Calcination may be conducted in batch-wise or continuous. It may be conducted in static mode or flow mode.

Calcination temperature is usually about 600° C. or more, preferably about 700° C. or more and usually about 1000° C. or less, preferably about 950° C. or less. Calcination time is usually 10 minutes or more, preferably about 30 minutes or more and usually about 24 hours or less, preferably about 10 hours or less.

Calcination is usually conducted under air or an inert gas ($N_2$, Ar). Calcination may also be conducted under air having controlled partial pressure of water vapor, for example, air having a partial pressure of water vapor of 600 Pa or less.

An α-alumina powder obtained by calcination mentioned above may also be ground. Grounding may advantageously be conducted, for example, by using a medium pulverizer such as a vibration mill and a ball mill, or an airflow pulverizer such as a jet mill. Further, an α-alumina powder obtained by calcination or α-alumina powder subjected to the above-mentioned grinding may also be classified.

An α-alumina powder obtained by the method of the present invention has an average particle diameter of usually about 0.01 μm or more, preferably about 0.05 μm or more and usually about 0.1 μm or less, preferably about 0.09 μm or less, has a high α-ratio and high BET specific surface area, and for example, the α-ratio is about 90% or more, preferably about 95% or more and the BET specific surface area is about 15 $m^2/g$ or more, preferably about 17 $m^2/g$ or more. The upper limit of the BET specific surface area is not restricted but is usually about 50 $m^2/g$ or less, preferably about 40 $m^2/g$ or less. The α-alumina powder has a small amount of particle having necking, and has a degree of necking of preferably 20% or less, further preferably 10% or less.

The α-alumina powder obtained by the method of the present invention has, as described above, a high α-ratio and large BET specific surface area and has a small amount of particle having necking, therefore, this powder is useful as a raw material for producing an α-alumina sintered body having high strength. The resulted α-alumina sintered body is suitable as a member for which high strength is required such as a cutting tool, bioceramics and bulletproof board. This α-alumina sintered body is, due to chemical stability such as excellent corrosion resistance, used as a part of an apparatus for producing a semiconductor such as a wafer handler; an electronic part such as an oxygen sensor; a translucent tube such as a sodium lamp and metal halide lamp; or a ceramic filter. A ceramics filter is used for removal of solid components contained in a exhaust gas, for filtration of aluminum melt, filtration of drinks (for example, beer), or selective permeation of a gas produced at petroleum processing or CO, $CO_2$, $N_2$, $O_2$, $H_2$ gas.

The α-alumina powder obtained by the production method of the present invention is used as an additive, toner or resin filler for improving head cleaning property and friction resistance by addition thereof to an application layer of a magnetic medium of application type. An α-alumina powder can be used also as a polishing material. For example, a slurry obtained by dispersing an α-alumina powder in a medium such as water is suitable for polishing of semiconductor CMP and polishing of a hard disk substrate. A polishing tape obtained by coating an α-alumina powder on the surface of a tape is suitable for precise polishing of a hard disk and magnetic head.

Further, an α-alumina powder is used as an additive for cosmetics, an additive for brake lining, or a catalyst carrier, and further used as a material of electric conductive sintered bodies and heat conductive sintered bodies.

EXAMPLES

The following examples will illustrate the present invention more in detail, but do not limit the scope of the invention. The property of an α-alumina powder was measured by the following method.

α-ratio (%): It is calculated according to the following formula (1) using the peak strength $I_{25.6}$ at 2 θ=25.60° (α-alumina) and the peak strength $I_{46}$ at 2 θ=46° from a diffraction spectrum measured under conditions radiation source: CuKα beam, 40 kV ×20 mA, monochromator: graphite, by using a powder X-ray diffractometer:

$$\alpha\text{-ratio} = I_{25.6}/(I_{25.6}+I_{46}) \times 100 (\%) \quad (1)$$

BET specific surface area (m²/g): It was measured by a nitrogen adsorption method.

Average primary particle diameter (μm): From a transmission electro micrograph of α-alumina powder, the maximum diameter along constant direction of each primary particle of any 20 or more particles was measured, and an average value of measured values was calculated.

Degree of Necking: Among 20 or more of particles on a transmission electron micrograph of α-alumina powder, the ratio of those in form of agglomerated two or more primary particles was calculated. The measuring method will be explained by following example.

In the diagram:
Particles in form of no agglomerated primary particles: 18
Particle in form of agglomerated two primary particles: 1
Particle in form of agglomerated three primary particles: 1

In this case, degree of necking was 10% [=2/(18+1+1)]

Example 1

[Preparation of Seed Crystal Slurry]

Aluminum hydroxide obtained by hydrolysis of aluminum isopropoxide was pre-calcined to obtain transition alumina of which main crystal phase is a θ phase and containing α-alumina in an amount of 3% by weight, then, this transition alumina was ground by using a jet mill to obtain a powder having a bulk density of 0.21 g/cm³.

100 g of this powder was charged in an atmosphere calcination furnace having a volume of 8 liter [trade name: "TUBULAR ATMOSPHERE FURNACE", manufactured by MOTOYAMA K.K.], and dry air having a due point of −15° C. (partial pressure of water vapor: 165 Pa) was introduced into the furnace at a rate of 1 L/min, and the atmosphere in the furnace was raised up to 1170° C. while maintaining its due point at −15° C., and kept at 1170° C. for 3 hours, then, cooled gradually; a calcined alumina was obtained under such calcination conditions, then, this calcined alumina was ground by using a vibration mill (grinding medium: alumina), obtaining α-alumina having a BET specific surface area of 16.0 m²/g.

20 parts by weight of this α-alumina was added and dispersed in 80 parts by weight of nitric acid of pH 4, then, the mixture was wet-classified for 3 hours by using a ball mill filled with alumina beads having a diameter of 2 mm, obtaining a seed crystal slurry.

[Production of Fine Particle α-alumina Powder]

375.13 g (1 mol) of aluminum nitrate hydrate [Al(NO₃)₃·9H₂O, manufactured by Wako Pure Chemical Industries Ltd., guaranteed reagent] was dissolved in 777.87 g of pure water, to obtain 1000 cm³ of an aluminum nitrate aqueous solution. To 100 cm³ of the aluminum nitrate aqueous solution was added 2.83 g of the above-mentioned seed crystal slurry (Al₂O₃ amount: 0.566 g), further, 2.64 g of ammonium nitrate [NH₄NO₃, manufactured by Wako Pure Chemical Industries Ltd., guaranteed reagent] was added to obtain a compound. 100 parts by weight of this compound contained 10 parts by weight of alumina [Al₂O₃] as a seed crystal, in terms of Al₂O₃. The concentration of a nitrate ion (NO₃⁻) in the compound was 3 mol per mol of the total aluminum (Al) contained in aluminum nitrate and seed crystal.

This compound was charged into a rotary evaporator. The pressure of the atmosphere in the rotary evaporator was reduced, and the outside of this was heated by water of 75° C., and water in the compound was removed to obtain a powder. The powder was charged into an aluminum crucible, this aluminum crucible was placed in a box-type electric furnace, and calcined for 3 hours under air of 890° C., to obtain an α-alumina powder. The properties of this α-alumina powder are shown in Table 1. The transmission electron micrograph of the α-alumina powder is shown in FIG. 1.

Example 2

Figure 2:
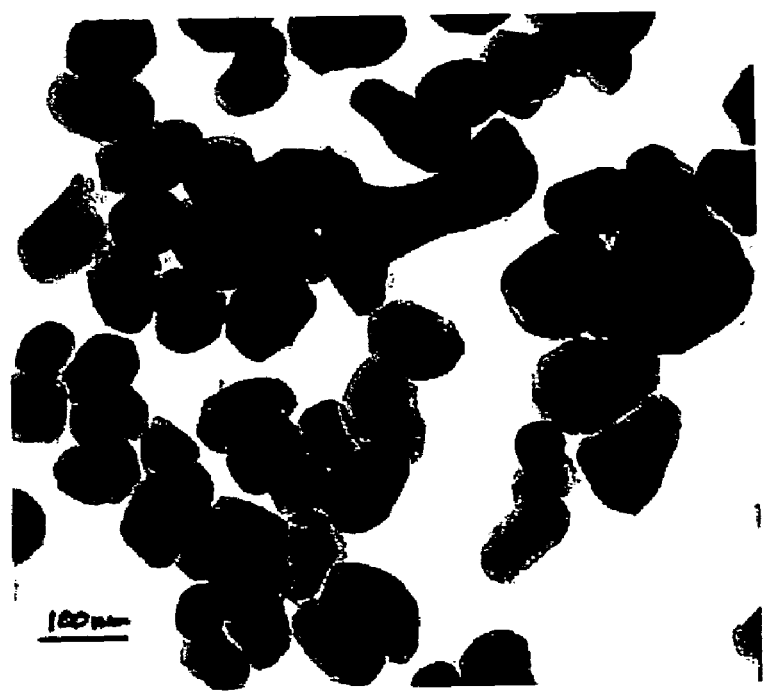
FIG. 2 shows a transmission electron micrograph of an α-alumina powder obtained in Example 2.

The same operation as in Example 1 was conducted excepting that the addition amount of ammonium nitrate was changed to 4.16 g and further, the calcination temperature was changed to 930° C. The properties of the resulted α-alumina powder are shown in Table 1. The concentration of a nitrate ion in the compound was 3.2 mol per mol of total aluminum (Al) contained in aluminum nitrate and seed crystal. The properties of the resulted α-alumina powder are shown in Table 1. The transmission electron micrograph of the α-alumina powder is shown in FIG. 2.

Comparative Example 1

Figure 3:
FIG. 3 shows a transmission electron micrograph of an α-alumina powder obtained in Comparative Example 1.

The same operation as in Example 1 was conducted excepting that ammonium nitrate was not added. The properties of the resulted α-alumina powder are shown in Table 1. The concentration of a nitrate ion in the compound was 2.7 mol per mol of total aluminum (Al) contained in aluminum nitrate and seed crystal. The properties of the resulted α-alumina powder are shown in Table 1. The transmission electron micrograph of the α-alumina powder is shown in FIG. 3.

Comparative Example 2

Figure 4:
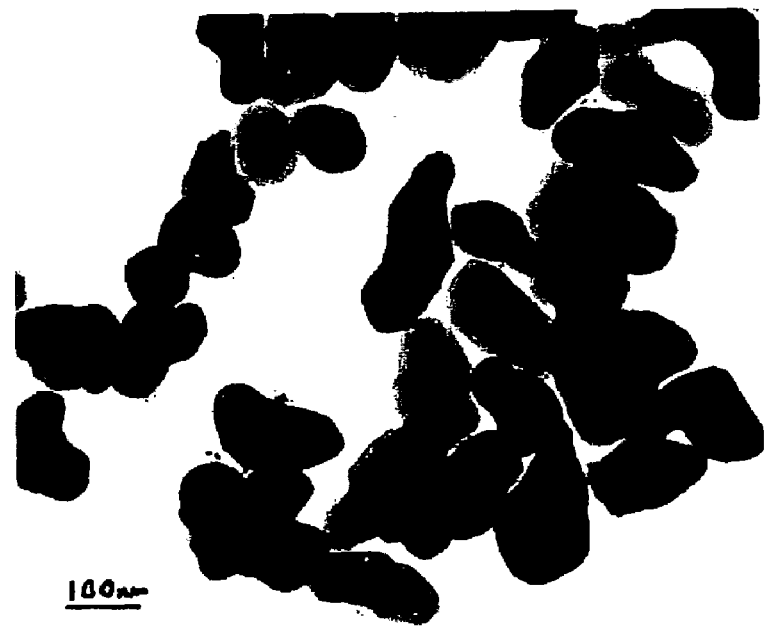
FIG. 4 shows a transmission electron micrograph of an α-alumina powder obtained in Comparative Example 2.

The same operation as in Example 1 was conducted excepting that the addition amount of ammonium nitrate was changed to 6.24 g and further, the calcination temperature was changed to 930° C. The properties of the resulted α-alumina powder are shown in Table 1. The concentration of a nitrate ion in the compound was 3.4 mol per mol of total aluminum (Al) contained in aluminum nitrate and seed crystal. The properties of the resulted α-alumina powder are shown in Table 1. The transmission electron micrograph of the α-alumina powder is shown in FIG. 4.

TABLE 1

Properties of α-alumina powder

| | α-ratio (%) | BET specific surface area (m²/g) | Average primary particle diameter (nm) | Degree of necking (%) |
|---|---|---|---|---|
| Example 1 | 97 | 14.1 | 70 | 17.9 |
| Example 2 | 96 | 13.8 | 84 | 9.6 |
| Comparative Example 1 | 95 | 15.9 | 96 | 66.7 |
| Comparative Example 2 | 97 | 14.0 | 115 | 80.0 |

What is claimed is:

1. A method for producing an α-alumina powder comprising the steps of removing water from a compound containing the following (1), (2), (3) and (4), and calcining the results:
   (1) α-alumina precursor,
   (2) seed crystal,
   (3) water,
   (4) nitrate ion in an amount of from 2.8 to 3.3 mol per mol of aluminum (Al) contained in the α-alumina precursor and the seed crystal.

2. The method according to claim 1, wherein the α-alumina precursor is at least one selected from the group consisting of aluminum salts, aluminum alkoxide, transition alumina, aluminum hydroxide and hydrolysate of aluminum compound.

3. The method according to claim 2, wherein the α-alumina precursor is an aluminum salt.

4. The method according to claim 3, wherein the α-alumina salt is aluminum nitrate.

5. The method according to claim 1, wherein the seed crystal is a metal oxide.

6. The method according to claim 5, wherein the seed crystal is a metal oxide having corundum crystal structure.

7. The method according to claim 6, wherein the seed crystal is at least one selected from the group consisting of α-alumina, α-iron oxide and α-chromium oxide.

8. The method according to claim 1, wherein the amount of the seed crystal is from 5 to 50 parts by weight based on 100 parts by weight of the total amount of the α-alumina precursor and the seed crystal, in terms of oxide of metal component.

9. The method according to claim 1, wherein the amount of the water is from 50 to 1000 parts by weight based on 100 parts by weight of the total amount of the α-alumina precursor and the seed crystal.

10. The method according to claim 1, wherein calcination is conducted at from 600 to 1000° C.

* * * * *